United States Patent Office 3,424,458
Patented Jan. 28, 1969

3,424,458
FOOTBALL BLOCKING TRAINING APPARATUS
John Henry Hopps, Jr., Peaslee Road,
South Merrimack, N.H. 03083
Filed Aug. 2, 1966, Ser. No. 569,684
U.S. Cl. 273—55     4 Claims
Int. Cl. A63b 69/34

This invention relates to football training apparatus.

The principal object of this invention is to provide an improved training apparatus that realistically simulates a football team for numerous purposes.

Particular objects of this invention are to provide a training sled capable of realistically simulating a defensive team, including line backers and secondary as well as the defensive line; to provide similar simulation of an offensive team; to provide a training sled in which the dummies are responsive as a unit to the combined movements of the opposing team in a realistic manner, although the individual dummies can react to the individual movements of players; and to provide a training sled which is exceedingly simple, economical and rapidly adjustable.

According to the invention it is realized that a practical training sled serving the objects as defined above can be achieved by use of a super-structure to which the dummies are rigidly fixed against movement in the direction of the runners of the sled, with the multiplicity of dummies being spaced on one or a plurality of cross bars in an adjustable manner, the cross bars being adjustable along the length of the sled, and the individual dummy members being adjustable on the respective cross bars.

It is further realized that a realistic movement of the dummies can be provided by means of mounting the dummies for lateral movement while providing spaced apart stops or equivalent retarding mechanisms which permits limited lateral movement of the dummies in response to the attacking force, while resisting all movement of the dummy relative to the direction of the sled runners.

Other objects, features, and advantages will appear from the following description of a preferred embodiment of the invention taken together with the attached drawings thereof, in which.

Figure 1:
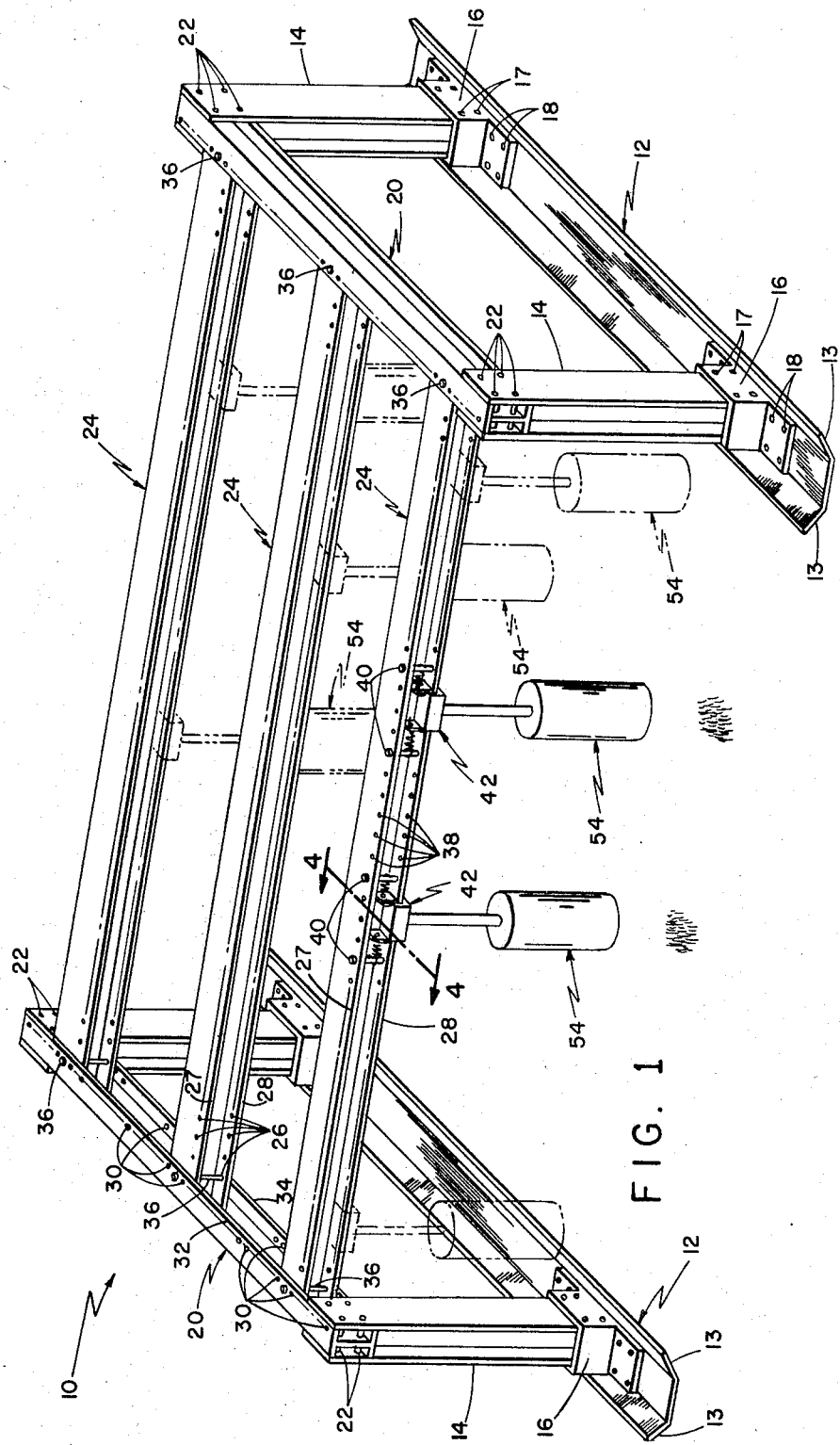
FIG. 1 is a perspective view of the training sled in accordance with this invention.

Referring to FIG. 1 there is shown a training sled 10 having runners 12 with upright posts 14 fastened to them by means of flanged collars 16. Runners 12 are provided with upturned side segments 13 to facilitate movement across the ground; similar segments may be formed on their ends. Collars 16 are joined to runners 12 by rivets 18, while posts 14 are joined to collars 16 by removable bolts 17. Suspension bars 20 are supported parallel to their respective runners by removable bolts 22 passed through holes in posts 14 in alignment with holes in bars 20.

Suspended between bars 20 are three cross bars 24 having vertically aligned holes 26 through their flanges 27, 28 at their ends. Vertically aligned holes 30, in flanges 32, 34 of suspension bar 20, only a few of said holes being shown in FIG. 1, cooperate to receive a fastening pin 36, posts 14, and bars 20 and 24 are steel girders of I beam configuration.

Figure 3:
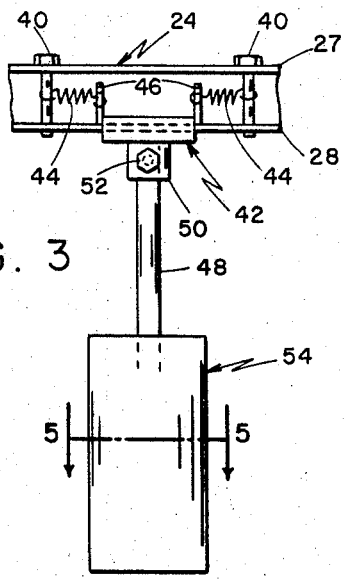
FIG. 3 is an enlarged, detailed view of a portion of the sled shown in FIG. 1.
Figure 4:
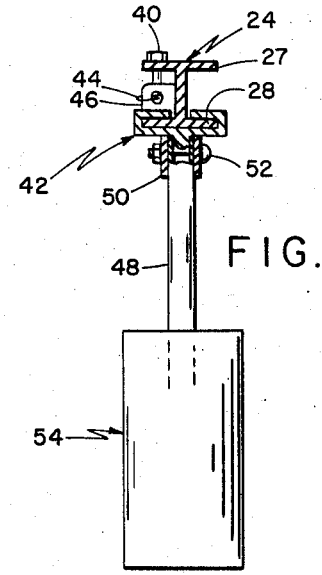
FIG. 4 is a sectional view taken along line 4—4 of FIG. 1.
Figure 5:
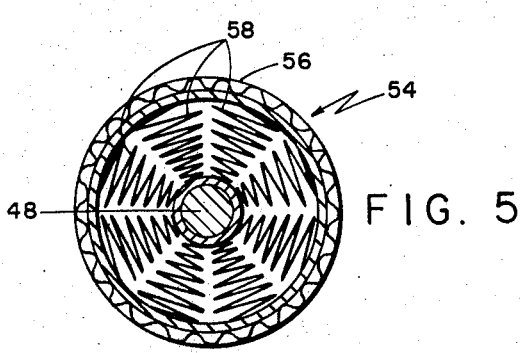
FIG. 5 is a sectional view taken along line 5—5 of FIG. 3.

Cross bars 24 contain a second set of vertically aligned holes 38 in flanges 27, 28 for receiving stop pins 40. Slide 42 movably mounted on flange 28 of bar 24 is connected to associated pins 40, FIG. 3, by springs 44 which engage tabs 46 on slide 42. Thus the slide offers resistance to lateral movement by springs 44 until it encounters a stop pin 40. Rigid core 48 extending into dummy 54 is connected to slide 42 by collar 50 and nut and bolt 52. The padded exterior 56 of dummy 54 is connected to core 48 by springs 58, FIG. 5. That dummy 54 cannot be moved transverse to cross bar 20 is made clear by the nature of the engagement of slide 42 with flange 28, shown in FIG. 4.

Figure 2:
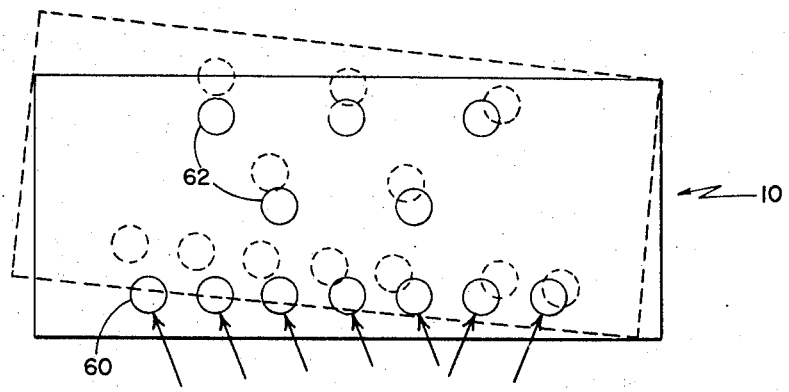
FIG. 2 is a diagrammatic top view of the apparatus showing the effect of the impact of a group of players on the position of the individual dummies and the sled.

According to the invention it is realized that the dummies, by being mounted on the training sled, provide a unique set of characteristics which closely simulate the characteristics of a defensive player. surface of the dummy being resilient, gives much as the body of the offensive player. The resistance to movement of the dummy in the direction of the runners represents very well the staple stance which the defensive player has assumed, reflecting his determination not to be backed up. The ability of the training sled to move, in particular, in response to the combined driving force of a number of offensive players hitting a corresponding number of defensive dummies, represents the fact that the players of the offensive team, the arrows in FIG. 2, in combination, can provide a unified effect which drives the defensive line 60 back. The second and third rows of dummies 62, the backfield, are moved bodily with the training sled when the first line of dummies is hit. This simulates quite well the fact that the secondary cannot assume fixed positions but must move as the play proceeds. The limited lateral movement of the dummies provide by spring 58 and stop 40 represented the fact that players can be moved sideways with somewhat greater facility than backwards, and thus can be pushed out of the way to open up a hole for the offensive team. The rigid mounting of the dummies, however, assures that they are not easily pushed aside, and also assures that the point of impact and application of moment to the sled device as a whole is relatively predetermined and thus can be established in a manner to prevent overturning of the training sled.

Obviously stop pins 40, therefore the positions of dummies 54, can be adjusted along the length of the cross bars 24 and the positions of the cross bars 24 can be adjusted along suspension bars 20, whereby various formations can be simulated.

As an example of a suitable dimension the distance between the runners 12 may be selected as 25 feet and the length of the runners themselves may be on the order of 15 feet. The height of the cross bar 10 from the ground may be on the order of 7 feet.

It will be appreciated that the training sled described can be very economically manufactured and yet is capable of forming many services which will permit the freeing of players who have previously had to simulate the defense during football practice. Numerous other uses for the apparatus are envisioned.

What is claimed is:

1. A football training apparatus comprising a plurality of elongated sled runners having upright members mounted thereto, at least one elevated cross bar extending between said upright members, and a plurality of dummy members secured to said cross bar; said dummy members being rigidly fixed against ovement in the direction of extension of said runners while being laterally movable along the length of said cross bar.

2. Apparatus of claim 1 wherein the upright members are provided with a number of mounting positions and the cross bar is adjustably fixed to one of them.

3. Apparatus of claim 1 further including stops spaced from said dummy member on said cross member for limiting lateral movement of said dummy member, and springs interconnecting said dummy member with a portion of said cross bar for resiliently resisting lateral movement of said dummy members.

4. The apparatus of claim 1 in which each said dummy members include:
  a slide mounted for movement along said cross bar,
  a rigid core connected to said slide,
  a padded shell into which said core extends, and
  a plurality of springs connecting said shell to said core.

References Cited

UNITED STATES PATENTS

| | | | |
|---|---|---|---|
| 1,538,203 | 5/1925 | Moran | 273—55 |
| 2,183,465 | 12/1939 | Noor | 273—55 X |
| 2,532,880 | 12/1950 | Banbury | 273—55 |
| 2,749,121 | 6/1956 | Myers | 273—55 |
| 3,104,875 | 9/1963 | Doyle | 273—55 |

RICHARD C. PINKHAM, *Primary Examiner.*

T. BROWN, *Assistant Examiner.*